United States Patent
Heisswolf et al.

(10) Patent No.: US 10,019,395 B2
(45) Date of Patent: Jul. 10, 2018

(54) PROCESSING SYSTEM WITH STACK MANAGEMENT AND METHOD FOR STACK MANAGEMENT

(71) Applicants: Dirk Heisswolf, Munich (DE); Andreas Ralph Pachl, Neubiberg (DE); Rafael Pena Bello, Munich (DE)

(72) Inventors: Dirk Heisswolf, Munich (DE); Andreas Ralph Pachl, Neubiberg (DE); Rafael Pena Bello, Munich (DE)

(73) Assignee: NXP USA, Inc., Austin, TX (US)

( * ) Notice: Subject to any disclaimer, the term of this patent is extended or adjusted under 35 U.S.C. 154(b) by 183 days.

(21) Appl. No.: 15/033,417

(22) PCT Filed: Nov. 8, 2013

(86) PCT No.: PCT/IB2013/060012
§ 371 (c)(1),
(2) Date: Apr. 29, 2016

(87) PCT Pub. No.: WO2015/067993
PCT Pub. Date: May 14, 2015

(65) Prior Publication Data
US 2016/0292097 A1    Oct. 6, 2016

(51) Int. Cl.
*G06F 13/24*   (2006.01)
*G06F 9/46*    (2006.01)
(Continued)

(52) U.S. Cl.
CPC ............... *G06F 13/26* (2013.01); *G06F 9/30* (2013.01); *G06F 13/24* (2013.01)

(58) Field of Classification Search
None
See application file for complete search history.

(56) References Cited

U.S. PATENT DOCUMENTS 5,950,221 A      9/1999   Draves et al.
6,000,002 A  *  12/1999   Bonitz ............... G05B 19/0428
                                                    710/260
(Continued)

FOREIGN PATENT DOCUMENTS

EP        2026237 A1      2/2009

OTHER PUBLICATIONS

International Search Report for application No. PCT/IB2013/060012, dated Aug. 7, 2014, 13 pages.

*Primary Examiner* — Hyun Nam

(57) ABSTRACT

The invention provides a processing system, comprising a memory comprising a processor call stack; a stack space usage register configured to determine the stack space usage of the processor call stack and to store a usage parameter indicative of the determined stack space usage; a first threshold register configured to store a pre-determinable first stack level threshold; and a first comparator configured to compare the usage parameter with the first stack level threshold and to output a first interrupt blocking signal, if the usage parameter exceeds the first stack level threshold, the first interrupt blocking signal being configured to block the decoding of interrupt signals input to the processing system and having interrupt priorities lower than or equal to or just lower than a first interrupt priority threshold. The invention further provides a method for stack management, especially in a processing system.

15 Claims, 2 Drawing Sheets

(51) Int. Cl.
*G06F 13/26* (2006.01)
*G06F 9/30* (2018.01)

(56) References Cited

U.S. PATENT DOCUMENTS

| | | | |
|---|---|---|---|
| 2003/0135844 A1* | 7/2003 | Yellin | G06F 9/44589 |
| | | | 717/126 |
| 2004/0143824 A1* | 7/2004 | Sarcar | G06F 9/4425 |
| | | | 717/145 |
| 2005/0177667 A1 | 8/2005 | Kimelman et al. | |
| 2006/0248315 A1 | 11/2006 | Honda | |
| 2008/0168460 A1* | 7/2008 | Lee | G06F 9/5016 |
| | | | 718/104 |
| 2008/0292285 A1* | 11/2008 | Fujinami | G11B 27/105 |
| | | | 386/241 |
| 2012/0324194 A1 | 12/2012 | Jacobs et al. | |
| 2015/0150024 A1* | 5/2015 | Grossi | G06F 9/30134 |
| | | | 718/108 |

* cited by examiner

PROCESSING SYSTEM WITH STACK MANAGEMENT AND METHOD FOR STACK MANAGEMENT

FIELD OF THE INVENTION

This invention relates to a processor with stack management capabilities, particularly with stack overflow prevention functionality. The invention also relates to a method for stack management, particularly for use in a processor.

BACKGROUND OF THE INVENTION

Processors use call stacks to temporarily store information associated with functions, tasks, routines or exceptions currently being executed in the processor. Such call stacks have a finite size and are operated in a push/pop fashion: Whenever additional information items are to be stored, they will be "pushed" onto the stack, i.e. stored on top of all information currently residing in the call stack. Upon finishing of a specific task, function or routine, the information items no longer needed on top of the stack may be "popped", one at a time starting from the top of the stack.

Problems may arise, if the amount of information items pushed onto the call stack exceeds the maximum stack size, causing so-called stack overflow errors. Such errors may for example occur, if interrupt requests (IRQ) are serviced by the processor. The processor then halts the process being currently executed, executes the task according to the current interrupt and returns to the halted process once the interrupt request has been served. Particularly problematic may be nested or recursive IRQs which themselves invoke other interrupts of even higher priority so that more and more information items get pushed onto the call stack without the chance to pop off other information items. Uncontrolled processing of IRQs may thus lead to undesirable stack overflow errors.

The document US 2005/0177667 A1 discloses techniques for controlling memory space usage in a call stack which employ alteration of priority levels of interrupts which are present in the stack. By increasing the priority levels of presently executed interrupts further pre-emption of higher priority interrupts causing an increase in stack memory resources may be effected.

There is, however, a need for improved solutions that are able to prevent stack overflows which solutions are more efficient with regard to memory usage and resource allocation and which are more reliable in terms of effectiveness in stack overflow prevention.

SUMMARY OF THE INVENTION

The present invention provides a processing system, a method for stack management and a non-transitory computer readable medium storing computer readable instructions as described in the accompanying claims.

One idea of the present invention is to monitor the call stack usage level of a call stack of a processing system and selectively disable or delay interrupts based on their priority level, if the current call stack usage level is higher than a critical threshold. In that manner, it can be guaranteed that the call stack is not further pushed with additional data items from interrupt services, until some of the call stack space has been freed up again.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
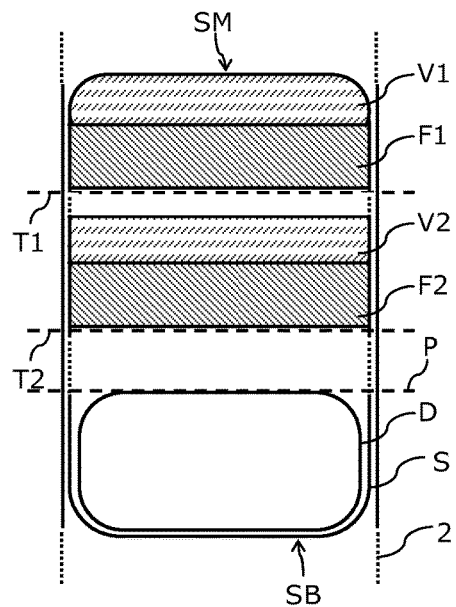
FIG. 1 schematically shows an exemplary embodiment of a processor call stack in a first operational state.

FIG. 1 illustrates an example of call stack S in a memory 2, for example a random access memory in a processor. The call stack S is configured to store processing information regarding functions and/or subroutines being executed in a processor. Such processing information may be related to the stack content D, which may include interrupt related information as well. The call stack S may have stack content D of varying size, depending on whether a caller of a function or subroutine pushes data on the call stack S or data is popped off the call stack S, for example when a function or subroutine is finished. If a called function or subroutine itself calls on to a nested sub-function or sub-subroutine, more data items will be pushed onto the call stack S, before the initially called function or subroutine has been able to pop its own data items from the call stack S.

The call stack S may have a starting address, the so-called stack bottom SB and an end address, the so-called upper stack space limit SM. If the size of all currently pushed data items exceeds the maximum processor call stack space SM-SB allocated for the call stack S, a stack overflow may occur, which generally causes the system utilizing the call stack S to crash. Moreover, undesired system stability and security issues may arise upon stack overflow errors. Thus, it is generally desirable to build a system that is inherently resilient to stack overflow errors.

The call stack S may therefore be monitored according to its call stack usage level, for example by monitoring the call stack pointer P which points to the current address of the top of the call stack S. Alternatively or additionally, it may also be possible to count the number of stack push operations and stack pop operations in order to determine the current call stack usage. In any case, a usage parameter P may be determined which is indicative of the current stack space usage.

Furthermore, one or more flexibly configurable stack level thresholds T1 and T2 may be defined to which the current stack space usage, i.e. the usage parameter P may be compared. The number of stack level thresholds is exemplarily shown as two in FIG. 1, however, any other number of stack level thresholds may be chosen as well, for example only one stack level threshold or three or more stack level thresholds. In the first operational state of the call stack S as shown in FIG. 1, the usage parameter P is below each of the stack level thresholds T1 and T2. Thus, the processing system utilizing the call stack S may operate unconditionally, i.e. interrupts of any priority level may be accepted and executed on top of the call stack S.

Figure 2:
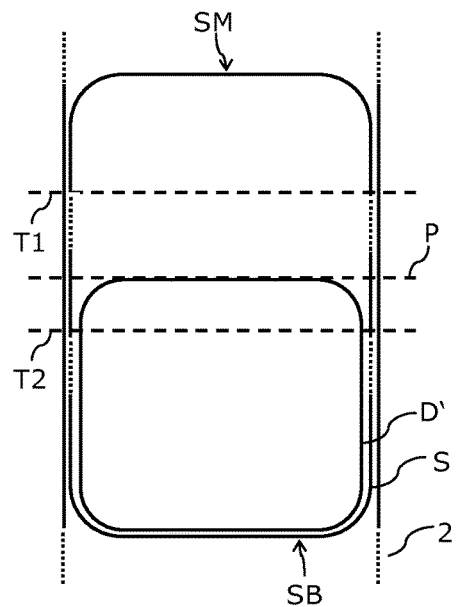
FIG. 2 schematically shows an exemplary embodiment of the processor call stack of FIG. 1 in a second operational state.

FIG. 2 illustrates a second operational state of the processor call stack S in the memory 2 of FIG. 1. In the second operational state of the processor call stack S, the call stack space usage exceeds the lower stack level threshold T2, i.e. the usage parameter P is higher than the stack level threshold T2. As the fill level call stack S nears the upper stack space limit SM, the decoding of interrupt signals that are input to the processing system and have interrupt priorities lower than or equal to a low interrupt priority threshold may be temporarily blocked. Alternatively, the decoding of interrupt signals that are input to the processing system and have interrupt priorities lower than a low interrupt priority threshold may be temporarily blocked. Such interrupts may stay pending, until the stack space usage, i.e. the usage parameter P falls under the lower stack level threshold T2 again, for example if data items are popped from the call stack S again due to functions or subroutines finishing and unwrapping. Interrupts having priorities higher than the low interrupt priority threshold associated with the lower stack level threshold T2 may still be serviced by the processing system as usual. This stops further increase of the call stack level by less important tasks and functions, while more important events are still serviced without delay.

Figure 3:
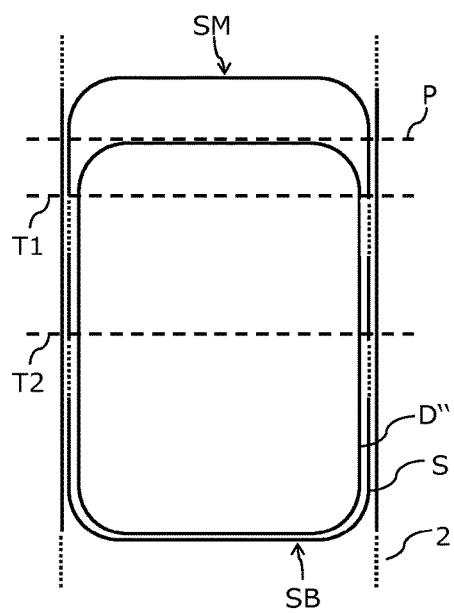
FIG. 3 schematically shows an exemplary embodiment of the processor call stack of FIG. 1 in a third operational state.

FIG. 3 illustrates a third operational state of the processor call stack S in the memory 2 of FIG. 1. In the third operational state of the processor call stack S, the call stack space usage exceeds both the lower stack level threshold T2 and the higher stack level threshold T1, i.e. the usage parameter P is higher than the stack level threshold T1. As the fill level call stack S critically nears the upper stack space limit SM, the decoding of interrupt signals that are input to the processing system and have interrupt priorities lower than or equal to, or alternatively just lower than, a high interrupt priority threshold may be temporarily blocked as well. Such interrupts may stay pending, until the stack space usage, i.e. the usage parameter P falls under the higher stack level threshold T1 again, for example if data items are popped from the call stack S again due to functions or subroutines finishing and unwrapping. Interrupts having priorities higher than the high interrupt priority threshold associated with the higher stack level threshold T1 may still be serviced by the processing system as usual.

In one embodiment, it may be possible to set the high interrupt priority threshold to the highest interrupt priority possible so that any kind of interrupt will be temporarily blocked. Therefore, it may be guaranteed that the call stack level is unable to exceed the upper stack space limit SM, thereby safely preventing any stack overflow errors.

Returning to FIG. 1, the difference between the first (higher) stack level threshold T1 and the maximum processor call stack space SM-SB is greater or equal to the size of an interrupt stack frame F1 of interrupt signals having interrupt priorities of the high interrupt priority threshold. This is the minimum headroom to the upper stack space limit SM to guarantee that the last of the interrupts admitted before all interrupts are blocked may still be serviced without provoking a stack overflow. Optionally, a stack space V1 for local variables and parameters of the interrupt signals having interrupt priorities higher than the higher interrupt priority threshold may be taken into consideration as well.

Similarly, the difference between the second (lower) stack level threshold T2 and the first (higher) stack level threshold T1 is greater or equal to the size of an interrupt stack frame F2 of interrupt signals having an interrupt priority of the low interrupt priority threshold. This is the minimum headroom to the first (higher) stack level threshold T1 to guarantee that the last of the low priority interrupts admitted may still be serviced, while at the same time a high priority interrupt may still be executed safely, since the low priority interrupts cannot fill the stack space above the first (higher) stack level threshold T1. Optionally, a stack space V2 for local variables and parameters of the interrupt signals having an interrupt priority of the low interrupt priority threshold may be taken into consideration as well.

Figure 4:
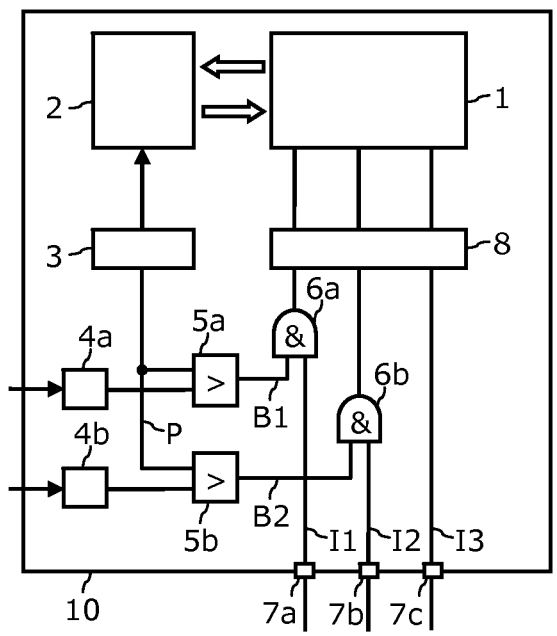
FIG. 4 schematically shows a hardware structure of a processing system with stack management capabilities according to an exemplary embodiment.

FIG. 4 shows a schematic block diagram of a processing system 10 implementing the stack overflow prevention measures as exemplarily explained in conjunction with FIGS. 1 to 3. Particularly, the processing system 10 may implement a method M as depicted in and explained in conjunction with FIG. 5 as set out below.

The processing system 10 comprises an execution and control unit, core or instruction sequencer 1 (shortly coined as execution and control unit 1 herein forth) and a memory 2. The memory 2 may for example be a random access memory (RAM), or any other type of computer data storage means. The memory 2 may be employed by the execution and control unit 1 as temporary storage for data items and processing information associated with the execution of functions, subroutines, task and similar programs. As such, the memory 2 may comprise a processor call stack S as shown in FIGS. 1 to 3.

The processing system 10 further comprises a stack space usage register 3 which is configured to determine the stack space usage of the processor call stack S and to store a usage parameter P indicative of the determined stack space usage. The usage parameter P may for example be a stack level pointer or a stack push operation count. The stack space usage register 3 may further be accessible by the execution and control unit 1 in order to calculate addresses of stack operations. It may also be possible for the execution and control unit 1 to update the content of the stack space usage register 3 with every stack operation having been executed.

The stack space usage register 3 is coupled to respective ones of the inputs of one or more comparators 5a and 5b. The processing system 10 further comprises first and second threshold registers 4a and 4b which are configured to store pre-determinable stack level thresholds T1 and T2. The pre-determinable stack level thresholds T1 and T2 may be set according to desired interrupt priority thresholds of a hierarchy of interrupts to be selectively blocked.

Each of the first and second threshold registers 4a and 4b is coupled to a respective other input of the comparators 5a and 5b. The comparators 5a and 5b are each configured to compare the usage parameter P with the first (higher) stack level threshold T1 and the second (lower) stack level threshold T2, respectively, and to output interrupt blocking signals B1 and B2, if the usage parameter P exceeds the first stack level threshold T1 and the second stack level threshold T2, respectively. The interrupt blocking signals B1 and B2 are respectively fed to first and second logic gates 6a and 6b. The logic gates 6a and 6b may for example be AND-gates which are fed with respective interrupt signals I1 and I2. The first logic gate 6a, for example, may be configured to block the decoding of interrupt signals I1 input to the processing system 10 at input 7a which have an interrupt priority lower than or equal to the first interrupt priority threshold by only letting the interrupt signals I1 pass, if the first interrupt blocking signal B1 is asserted logically high. Similarly the second logic gate 6a may be configured to block the decoding of interrupt signals I2 input to the processing system 10 at input 7b which have an interrupt priority lower than or equal to the second interrupt priority threshold by only letting the interrupt signals I2 pass, if the second interrupt blocking signal B2 is asserted logically high.

The interrupt signals I1 and I2 are then—subject to the selective blocking in the logic gates 6a and 6b—passed on to an interrupt arbiter 8 of the processing system 10 which is coupled to the execution and control unit 1 and which is configured to decode the interrupt signals I1 and I2. Moreover, the interrupt arbiter 8 may optionally also decode interrupt signals I3 input to the processing system 10 at input 7c which are not subject to the selective blocking by one of the logic gates 6a and 6b.

The number of threshold registers 4a and 4b, comparators 5a and 5b, and logic gates 6a and 6b in the processing system 10 of FIG. 4 is only exemplarily shown as two, however, as should be evident to the skilled person in the art, more or less respective threshold registers, comparators and logic gates may be provided as well, depending on the desired granularity of interrupt priority filtering.

Figure 5:
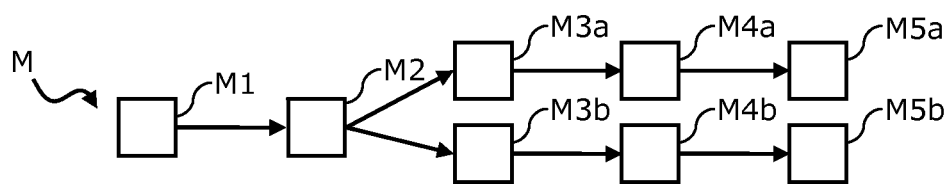
FIG. 5 schematically shows an exemplary method for stack management according to another exemplary embodiment.

FIG. 5 illustrates a schematic flow diagram of a method M for stack management in a processor, particularly for implementation in a processing system 10 as shown in FIG. 4. The method M may be implemented in hardware, as explained in conjunction with FIG. 4, however, it may equally be possible to implement the method M in software, i.e. in a non-transitory computer readable medium configured to store computer readable instructions which, when executed on a processor, cause the processor to execute a process according to the method M.

The method M may include at M1 a determination of the stack space usage of a processor call stack S in a memory 2 of the processing system 10. The respectively determined stack space usage may then be transformed into a usage parameter P, such as a stack level pointer or a stack push operation count, which parameter P is then stored at M2, for example in a stack space usage register 3. In particular, the processes at M1 and M2 may happen at the same time, due to the usage parameter P directly indicating the used stack space. At M3a, the usage parameter P is then compared with a pre-determinable first (higher) stack level threshold T1 so that at M4a a first interrupt blocking signal B1 may be output, if the usage parameter P exceeds the first (higher) stack level threshold T1. Based on the first interrupt blocking signal B1 the decoding of interrupt signals I1 input to the processing system 10 having an interrupt priority lower than or equal to a first interrupt priority threshold may be temporarily blocked at M5a.

Similarly, at M3b, the usage parameter P may optionally be compared with a pre-determinable second (lower) stack level threshold T2, so that at M4b a second interrupt blocking signal B2 may be output, if the usage parameter P exceeds the second (lower) stack level threshold T2. Based on the second interrupt blocking signal B2 the decoding of interrupt signals I2 input to the processing system 10 having an interrupt priority lower than or equal to a second interrupt priority threshold may be temporarily blocked at M5b.

The processing system 10 may, for example, be or comprise a microprocessor or microcontroller. Such a processing system 10 may be employed in a processing device, for example a central processing unit (CPU) and/or a coprocessor and/or a digital signal processor and/or an embedded processor.

The processing system 10 may for instance include one, or more, processor cores which can execute the instructions in a memory connected to the processor core. The processor cores may for instance include the logic circuitry required to execute program code in the form of machine code. The processor cores may for instance at least include an instruction decoder, an arithmetic unit, an address generation unit, and a load/store unit. The processing system 10 may for example include, in addition to the processor core and the components as shown in conjunction with FIG. 4, inputs/outputs or other components, such as and/or communication interfaces and/or coprocessors and/or analog-to-digital converters and/or clocks and reset generation units, voltage regulators, memory (such as for instance flash, EEPROM, RAM), error correction code logic and/or timers or other suitable components.

The processing system 10 may, for example, be employed in a safety critical system. A safety critical system may, for example, be an automotive safety critical system, where possible malfunction or wrong usage may endanger, for example, a user of the system, e.g. a car driver. A safety critical system may, for example, be part of electronic equipment of a power plant or a self-propelled vehicle, such as a car, truck, plane, ship, helicopter, etc. An automotive safety critical system, may, for example, comprise an engine control unit (ECU). An automotive safety critical system may, for example, be a car safety system. A safety critical system may comprise a seat position control system, lighting, airbags, windscreen wipers, immobilizers, electronic climate control, a brake system or an electrical steering system. A brake system may comprise, for example, an anti-lock braking system (ABS), an electronic brake force distribution system (EBD), a cornering brake control (CBC) system etc. An electrical steering system may comprise, for example, an electronic stability control system (ESC), a traction control system (TCS) or anti-slip regulation system (ASR), an adaptive cruise control (ACC) system, a forward collision warning (FCW) system or similar system.

From the foregoing, it is well understood by those skilled in the art that in an example of the present example the stack management making use of two stack level thresholds is exemplarily and not limiting the present invention. A stack management according to an example of the present invention may make use of n stack level thresholds T1 to Tn differing from each other and arranged in ascending or descending order of value. Each interrupt is assignable to or associatable with a priority value Pri. The range of priority values may at least comprise n+1 differing priority values Pri1 to Pri(n+1). For the sake of explanation, the n stack level thresholds T1 to Tn and the n+1 priority values Pri1 to Pri(n+1) should be considered to be arranged in ascending order of value. Each stack level thresholds Ti is associated with a priority value Pri(i). For the sake of explanation, it should be assumed that the usage parameter P exceeds (or equal to, eventually) the stack level threshold Tk, where 1≤k≤n. The priority value Pri(k) is associated with the stack level threshold Tk, which means that the decoding of interrupt signals that are input to the processing system having interrupt priorities lower than or equal to the priority value Pri(k) may be temporarily blocked and the decoding of interrupt signals that are input to the processing system having interrupt priorities higher than the priority value Pri(k) may still be serviced by the processing system.

Any blocked interrupt signal may stay pending until the stack space usage, i.e. the usage parameter P, falls under the stack level threshold Tj, where the priority value of the block interrupt signal is higher than the priority value Pri(j) associated with the stack level threshold Tj.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. Conversely, if the logically true state is a logic level zero, the logically false state is a logic level one. It will be apparent to the skilled person in the field that the exemplarily depicted logic components and units in the figures may equally be implemented by inverse logic components and units being fed with respectively inverse logic signals or status bits.

Because the apparatus implementing the present invention is, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different circuitry components. For example, the exemplary topology in the figures and the discussion thereof is presented merely to provide a useful reference in discussing various aspects of the invention. Of course, the description of the topology has been simplified for purposes of discussion, and it is just one of many different types of appropriate topologies that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. For example, the memory 2 of FIG. 4 may be integrated with other memory components in the processing system 10.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device.

The invention claimed is:

1. A processing system, comprising:
a memory comprising a processor call stack;
a stack space usage register configured to determine the stack space usage of the processor call stack and to store a usage parameter indicative of the determined stack space usage;
a first threshold register configured to store a pre-determinable first stack level threshold; and a first comparator configured to compare the usage parameter with the first stack level threshold and to output a first interrupt blocking signal when the usage parameter exceeds the first stack level threshold, the first interrupt blocking signal being configured to block the decoding of interrupt signals input to the processing system and having interrupt priorities lower than or equal to a first interrupt priority threshold.

2. The processing system of claim 1, further comprising:
a second threshold register configured to store a pre-determinable second stack level threshold;
and a second comparator configured to compare the usage parameter with the second stack level threshold and to output a second interrupt blocking signal, if the usage parameter exceeds the second stack level threshold, the second interrupt blocking signal being configured to block the decoding of interrupt signals input to the processing system and having interrupt priorities lower than or equal to a second interrupt priority threshold, wherein the first interrupt priority threshold is higher than the second interrupt priority threshold.

3. The processing system of claim 1, further comprising:
an execution and control unit configured to store processing information regarding functions and/or subroutines being executed in the processing system in the processor call stack.

4. The processing system of claim 3, further comprising:
an interrupt arbiter coupled to the execution and control unit and configured to decode interrupt signals being input to the processing system.

5. The processing system of claim 4, further comprising:
a first logic gate configured to be fed with the first interrupt blocking signal and the interrupt signals having interrupt priorities lower than the first interrupt priority threshold and to pass the interrupt signals depending on a logical operation with the first interrupt blocking signal.

6. The processing system of claim 1, wherein the memory is a random access memory.

7. The processing system of claim 1, wherein the usage parameter is one of a stack level pointer and a stack push operation count.

8. The processing system of claim 1, wherein the difference between the first stack level threshold and a maximum processor call stack space is greater or equal to the size of an interrupt stack frame of interrupt signals having interrupt priorities of the first interrupt priority threshold.

9. A method for stack management in a processing system, the method comprising:

determining the stack space usage of the processor call stack in a memory of the processing system;

storing a usage parameter indicative of the determined stack space usage;

comparing the usage parameter with a pre-determinable first stack level threshold;

outputting a first interrupt blocking signal when the usage parameter exceeds the first stack level threshold; and blocking the decoding of interrupt signals input to the processing system and having interrupt priorities lower than or equal to a first interrupt priority threshold depending on the first interrupt blocking signal.

10. The method of claim 9, further comprising:

comparing the usage parameter with a pre-determinable second stack level threshold; and outputting a second interrupt blocking signal, if the usage parameter exceeds the second stack level threshold; and blocking the decoding of interrupt signals input to the processing system and having interrupt priorities lower than or equal to a second interrupt priority threshold depending on the second interrupt blocking signal, wherein the first interrupt priority threshold is higher than the second interrupt priority threshold.

11. The method of claim 9, wherein processing information regarding functions and/or subroutines being executed in the processing system is stored in the processor call stack.

12. The method of claim 9, wherein the memory is a random access memory.

13. The method of claim 9, wherein the usage parameter is one of a stack level pointer and a stack push operation count.

14. The method of claim 9, wherein the difference between the first stack level threshold and a maximum processor call stack space is greater or equal to the size of an interrupt stack frame of interrupt signals having an interrupt priority of the first interrupt priority threshold.

15. A non-transitory computer readable medium storing computer readable instructions which, when executed on a processing system, cause the processing system to execute a process including:

determining the stack space usage of the processor call stack in a memory of the processing system;

storing a usage parameter indicative of the determined stack space usage;

comparing the usage parameter with a pre-determinable first stack level threshold;

outputting a first interrupt blocking signal, when the usage parameter exceeds the first stack level threshold; and blocking the decoding of interrupt signals input to the processing system and having interrupt priorities lower than a first interrupt priority threshold depending on the first interrupt blocking signal.

* * * * *